(12) United States Patent
Xie

(10) Patent No.: US 7,733,329 B2
(45) Date of Patent: Jun. 8, 2010

(54) PATTERN DETECTION USING AN OPTICAL NAVIGATION DEVICE

(75) Inventor: Tong Xie, San Jose, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 1267 days.

(21) Appl. No.: 11/254,034

(22) Filed: Oct. 19, 2005

(65) Prior Publication Data

US 2007/0085859 A1 Apr. 19, 2007

(51) Int. Cl.
*G09G 5/00* (2006.01)
(52) U.S. Cl. .................. 345/166; 345/156; 382/181
(58) Field of Classification Search ......... 345/156–172; 382/181, 209–221
See application file for complete search history.

(56) References Cited

U.S. PATENT DOCUMENTS

| | | | |
|---|---|---|---|
| 5,920,658 A * | 7/1999 | Yamagata et al. ........... 382/293 |
| 6,585,158 B2 * | 7/2003 | Norskog ................. 235/462.13 |
| 2002/0140667 A1 * | 10/2002 | Horiki ......................... 345/156 |
| 2004/0125073 A1 * | 7/2004 | Potter et al. ................. 345/156 |
| 2005/0068300 A1 * | 3/2005 | Wang et al. ................. 345/166 |
| 2005/0083304 A1 * | 4/2005 | Wang et al. ................. 345/166 |
| 2005/0099410 A1 * | 5/2005 | Liew et al. .................. 345/204 |
| 2005/0151724 A1 * | 7/2005 | Lin et al. .................... 345/166 |
| 2006/0045312 A1 * | 3/2006 | Bernstein et al. ............ 382/103 |

* cited by examiner

*Primary Examiner*—Amare Mengistu
*Assistant Examiner*—Jennifer Zubajlo

(57) ABSTRACT

An optical navigation device that is capable of performing pattern detection. An optical navigation device according to the present teachings includes a image sensor that acquires a series of images of a surface and an image buffer for holding a template and a processor that detects a pattern on the surface by comparing the series of images to the template. The form factor of an optical navigation device enables its use as a pattern detection device for a wide variety of patterns on a wide variety of surfaces having a wide variety of forms.

15 Claims, 1 Drawing Sheet

PATTERN DETECTION USING AN OPTICAL NAVIGATION DEVICE

BACKGROUND

Pattern detection, also known as pattern recognition, may be defined as a machine vision technique for detecting visual patterns, e.g. patterns printed on paper or other media. Pattern detection may have a variety of applications. Example applications of pattern detection include reading bar codes, verifying watermarks, optical character recognition, as well as biometric applications such as face recognition, fingerprint recognition, etc.

Prior pattern detection devices may be relatively sophisticated and expensive devices. For example, a pattern detection device may be implemented as a specialized device having optics and an image sensor for acquiring images and a processor and code for performing pattern recognition on the acquired images. Unfortunately, specialized pattern detection devices may be relatively expensive.

Pattern detection may be performed using a computer system, e.g. a personal computer, that is equipped with an appropriate imaging device, e.g. a scanner. Unfortunately, a personal computer with a scanner may be a relatively expensive way of performing pattern detection. In addition, a scanner for a personal computer may not be useful for detecting patterns on a medium that cannot be fed into a scanner, e.g. images on walls, boxes, or other surfaces.

SUMMARY OF THE INVENTION

An optical navigation device is disclosed that is capable of performing pattern detection. An optical navigation device according to the present teachings includes an image sensor that acquires a series of images of a surface and an image buffer for holding a template and a processor that detects a pattern on the surface by comparing the series of images to the template. The form factor of an optical navigation device enables its use as a pattern detection device for a wide variety of patterns on a wide variety of surfaces having a wide variety of forms. In addition, an optical navigation device according to the present teachings may be implemented as a relatively inexpensive pattern detection device by using pre-existing mechanisms in an optical navigation device.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
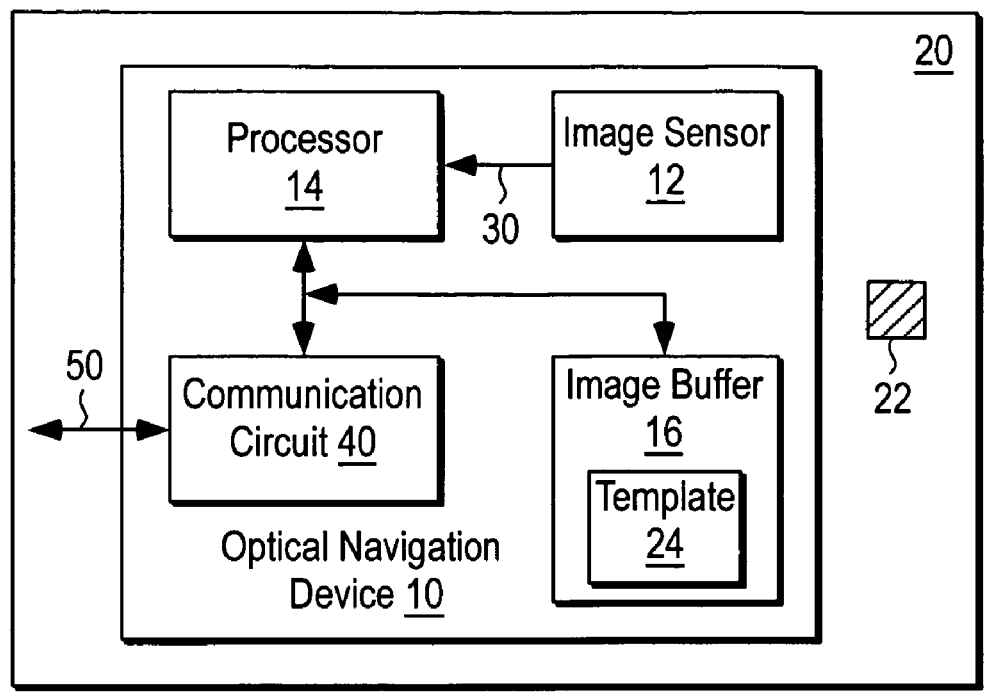
FIG. 1 shows an optical navigation device according to the present teachings.

FIG. 1 shows an optical navigation device 10 according to the present teachings. The optical navigation device 10 includes a image sensor 12, a processor 14, an image buffer 16, and a communication circuit 40. The optical navigation device 10 in the example shown detects a pattern 22 on a surface 20.

The optical navigation device 10 may be an optical navigation mouse for a computer or a light pen input device for a computer, to name a couple of examples. The image sensor 12, the processor 14, and the communication circuit 40 may be pre-existing mechanisms in the optical navigation device 10 for performing optical navigation functions, e.g. mouse pointing functions, for a host computer. In some embodiments, the power of the processor 14 may be augmented over that used to perform normal navigation functions, e.g. by increasing its speed, level of integration, memory capacity, etc., to support pattern detection.

The surface 20 may be any type of surface. Examples of the surface 20 include paper, cardboard, painted surfaces, wood surfaces, metals, etc. The pattern 22 may be any pattern. Examples of the pattern 22 include bar codes, watermarks including invisible watermarks, fingerprints, text, icons, forensic features, etc.

The image sensor 12 takes images of the surface 20. For example, the image sensor 12 acquires a series of images 30 of the surface 20 as a user moves the optical navigation device 10 across the surface 20 when detecting the pattern 22. Each image in the series of images 30 includes a two-dimensional array of pixel data values sampled from the surface 20.

The optical navigation device 10 may include a light source for illuminating the surface 20 when taking images with the image sensor 12. A light source of the optical navigation device 10 may be adapted to a pattern recognition application. For example, an infrared LED may be used to illuminated the surface 20 when the optical navigation device 10 is used to detect invisible patterns in the surface 20, e.g. patterns produced by infrared absorbing or reflecting ink. A light source may be selected for its utility in illuminating particular types of patterns on the surface 20. For example, a light source may be selected for its wavelength so that patterns on the surface 20 may be made visible even though the patterns may be invisible to the human eye. As an example, an ultra-violet light source may be used to illuminate fluorescent die pattern on the surface 20. A light source may be visible light, infrared light, broadband or narrowband, coherent or incoherent, etc.

The processor 14, in connection with the normal mouse function of the optical navigation device 10, determines a motion of the optical navigation device 10 with respect to the image surface 20 in response to the series of images 30. The processor 14 may determine the motion of the optical navigation device 10 by calculating a cross-correlation metric using the pixel data values of the images 30. The processor 14 may periodically designate a image in the series of images 30 as a reference frame and calculate the cross-correlation metric between the reference frame and a set of subsequent images in the series of images 30.

The image buffer 16 holds a template 24. The template 24 defines a pattern to be detected using the optical navigation device 10. Examples of the template 24 include a bar code pattern, a watermark pattern, a text pattern, a fingerprint pattern, etc. The template 24 includes a two-dimensional array of pixel data values.

The processor 14 in addition to its motion tracking mouse function performs pattern detection as a user moves the optical navigation device 10 across the surface 20. The processor 14 performs pattern detection by comparing the template 24 to the series of images 30. The processor 14 may compare each image in the series of images 30 to the template 24 as it is acquired from the image sensor 12. Alternatively, the processor 14 may compare each reference frame in the series of images 30 to the template 24. A reference frame in an optical navigation mouse, for example, may be compared to subsequent frames to determine the direction and magnitude of motion of the optical navigation mouse. The reference frame may be updated typically when the cumulative detected motion exceeds a predetermined amount, e.g. 2/3 of the field-of-view of the image sensor 12. The comparison of the template 24 to only the reference frames reduces the processing load on the processor 14 which potentially enables a cost reduction in the optical navigation device 10. The processor 14 may compare a image to the template 24 by calculating a cross-correlation metric using the pixel data values of the image and the template 24, e.g. a high degree of correlation may indicate a good match between the image and the template 24 and signal a match.

The image buffer 16 may hold multiple templates. The processor 14 may compare acquired images to one or more of the templates as it performs a pattern detection process.

The optical navigation device 10 detects patterns that are larger than the field of view of the image sensor 12 by stitching together the series of images 30 in response to the motion of the optical navigation device 10. For example, if the pattern 22 is larger than the field of view of the image sensor 12, the user of the optical navigation device 10 may capture the pattern 22 by moving the optical navigation device 10 over the pattern 22 back and forth to sample swaths of the pattern 22. Some of the images 30 will include image samples of portions of the pattern 22 depending on the motion employed by the user. As the user moves the optical navigation device 10 to sample the pattern 22, the processor 14 determines a motion vector for each pair of images in the series of images 30 as part of its motion tracking function. The processor 14 uses the motion vectors to stitch together images from the series of images 30 and generate a composite image that contain pattern 22. The processor 14 then compares the composite image to the templates in the image buffer 16.

The communication circuit 40 enables the optical navigation device 10 to receive the template 24 via a communication path 50 from an external source, e.g. a host computer. The communication path 50 may be the same communication path that the optical navigation device 10 uses for its normal mouse functions, e.g. serial link, USB, wireless, etc.

The optical navigation device 10 may signal a successful pattern detection by sending an event notification via the communication path 50. An event notification message may include an identifier of which template in the image buffer 16 was detected.

Figure 2:
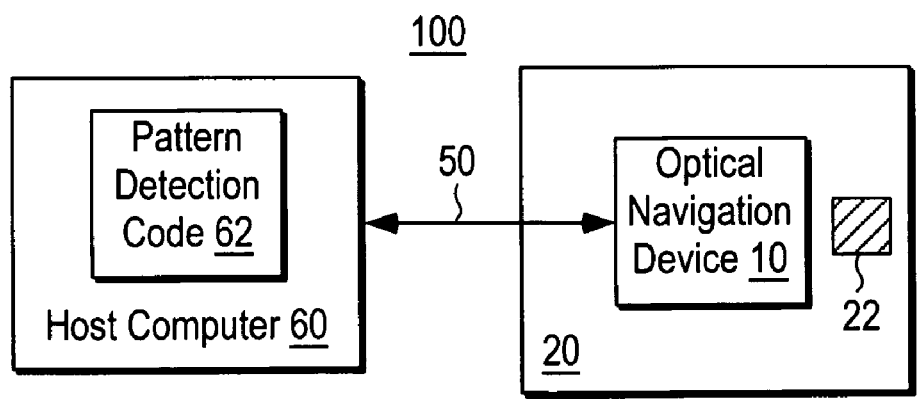
FIG. 2 shows an optical navigation system according to the present teachings.

FIG. 2 shows an optical navigation system 100 according to the present teachings. The optical navigation system 100 includes the optical navigation device 10 and a host computer 60 that communication via the communication path 50.

In one embodiment, the host computer 60 sends the template 24 to the optical navigation device 10 via the communication path 50 and the template 24 is stored into the image buffer 16. The host computer 60 may also send a command to the optical navigation device 10 to cause it to perform a pattern recognition operation. Alternatively, the optical navigation device 10 may perform a pattern recognition operation in response to a user input function of the optical navigation device 10. For example, the optical navigation device 10 may include a button that when pressed by a user starts a pattern recognition operation. The host computer 60 receives notification of pattern detection events via the communication path 50 from the optical navigation device 10.

In another embodiment, the optical navigation device 10 transfers the series of images 30 to the host computer 60 via the communication path 50 as a user moves the optical navigation device 10 across the surface 20 when performing a pattern detection operation. The host computer 60 includes a set of pattern detection code 62 that detects the pattern 22 by comparing the images in the series of images 30 to the template 24 which is stored on the host computer 60. The host computer 60 may compare a image to the template 24 by calculating a cross-correlation metric using the pixel data values of the image and the template 24, e.g. a high degree of correlation may indicate a good match between the image and the template 24 and indicate a match. The host computer 60 may determine a motion of the optical navigation device 10 in response to the series of images 30 and stitch together the series of images 30 if the pattern 22 is larger than the field of view of the image sensor 12.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. An optical navigation device, comprising:
   image sensor that acquires a series of images of a surface;
   image buffer for holding a template; and
   processor that detects a pattern on the surface by comparing more than one image in the series of images to the template,
   wherein the processor detects the pattern by determining a motion of the optical navigation device with respect to the surface in response to the series of images and generating a combined image by stitching together a subset of the images in the series in response to the motion and comparing the combined image to the template.

2. The optical navigation device of claim 1, wherein the optical navigation device is an optical navigation mouse.

3. The optical navigation device of claim 1, wherein the optical navigation device is a light pen.

4. The optical navigation device of claim 1, wherein the processor compares each image in the series to the template.

5. The optical navigation device of claim 1, further comprising a light source for illuminating the surface.

6. The optical navigation device of claim 5, wherein the light source is selected in response to the pattern on the surface.

7. The optical navigation device of claim 5, wherein the light source has a wavelength that is selected in response to the pattern on the surface.

8. The optical navigation device of claim 1, further comprising a communication path for obtaining the template from a host computer.

9. A pattern detection system, comprising:
   optical navigation device having a image sensor that acquires a series of images of a surface; and
   host computer that obtains the series of images from the optical navigation device and that detects a pattern by comparing more than one image in the series of images to a template,
   wherein the host computer generates a combined image by stitching together a subset of the images and compares the combined image to the template.

10. The pattern detection system of claim 9, wherein the optical navigation device is an optical navigation mouse.

11. The pattern detection system of claim 9, wherein the optical navigation device is a light pen.

12. The pattern detection system of claim 9, wherein the host computer stitches together the subset of the images by determining a motion of the optical navigation device in response to the images.

13. The pattern detection system of claim 9, wherein the optical navigation device includes a light source for illuminating the surface.

14. The pattern detection system of claim 13, wherein the light source is selected in response to the pattern on the surface.

15. The pattern detection system of claim 13, wherein the light source has a wavelength that is selected in response to the pattern on the surface.

* * * * *